March 31, 1936.  E. M. SWIFT  2,035,678
ELECTROPNEUMATIC GEAR SHIFT
Filed March 22, 1934  2 Sheets-Sheet 1

INVENTOR
Edwin M. Swift
BY
Fred C. Matheny
ATTORNEY

March 31, 1936.　　　　　E. M. SWIFT　　　　　2,035,678
ELECTROPNEUMATIC GEAR SHIFT
Filed March 22, 1934　　　　2 Sheets-Sheet 2
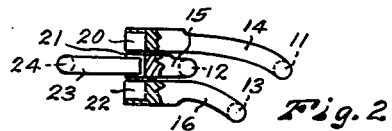
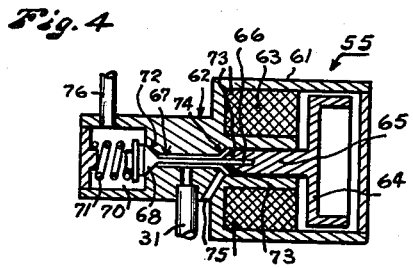
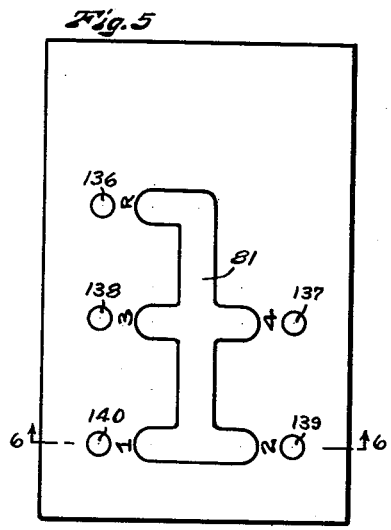
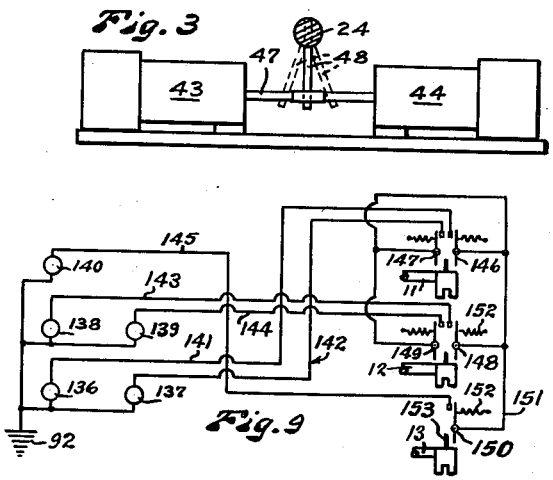
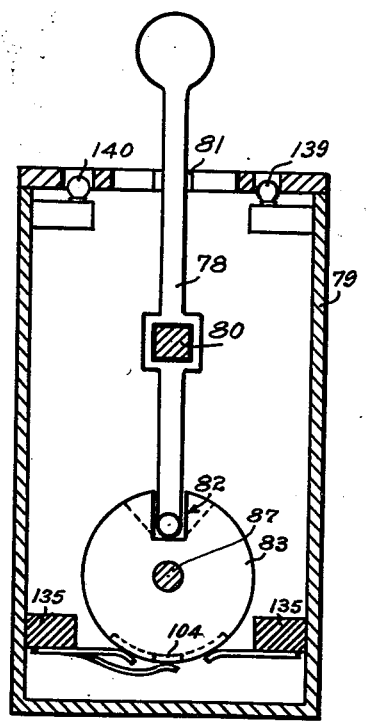
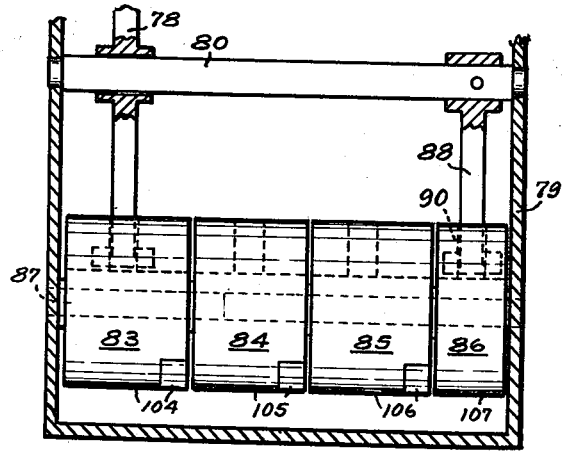
INVENTOR
Edwin M. Swift
BY
Fred C. Matheny
ATTORNEY Patented Mar. 31, 1936

2,035,678

UNITED STATES PATENT OFFICE 2,035,678

ELECTROPNEUMATIC GEAR SHIFT

Edwin M. Swift, Seattle, Wash., assignor of one-half to George Newell, Seattle, Wash.

Application March 22, 1934, Serial No. 716,805

9 Claims. (Cl. 74—334)

My invention relates to an electrically controlled pneumatically operated gear shift for the change speed gears of motor vehicles and the general object of my invention is to provide a simple and efficient gear shift which is readily applied to selective sliding gear transmissions of the form used on large motor vehicles and which may be controlled from a remote location.

Another object is to provide a reliable and efficient gear shift which avoids the use of relatively long operating rods and like mechanical connections on vehicles, as stages, where the transmission gear is located at a considerable distance away from the driver's seat.

Another object of the invention is to provide an electrically controlled pneumatically operated gear shift which requires very little labor and effort on the part of the driver, to operate, and which is positive and reliable in operation and not liable to get out of order.

A further object of the invention is to provide a gear shift means having a control which is connected with the clutch control mechanism whereby the clutch must be disengaged before a selected shift of the gears can be made.

A still further object of the invention is to provide an electrically controlled pneumatically operated gear shift in which the gears are held in driving relation by mechanical means and do not depend on an electric or pneumatic hold in.

Other and more specific objects of the invention will be apparent from the following description taken in connection with the accompanying drawings.

In the drawings, Figure 1 is a diagrammatic or schematic view illustrating my invention, parts being shown in section.

Fig. 2 is a fragmentary detached and elevation of the gear shift rods and actuating bar and illustrating the selective gear shift rod engaging means.

Fig. 3 is a sectional view substantially on broken line 3—3 of Fig. 1 showing parts of the selector mechanism.

Fig. 4 is a sectional view of one of the electromagnetically controlled valves embodied in the invention.

Fig. 5 is a plan view of the controller housing, the controller handle being omitted.

Fig. 6 is a sectional view of the controller housing taken substantially on broken line 6—6 of Fig. 5.

Fig. 7 is a fragmentary view partly in section and partly in elevation of the controller and housing.

Fig. 8 is a fragmentary sectional view of the locking dog means, used for locking a main actuating bar.

Fig. 9 is a diagram showing signal lamps used in connection with my invention.

Like reference numerals designate like parts throughout the several views.

Figure 1:
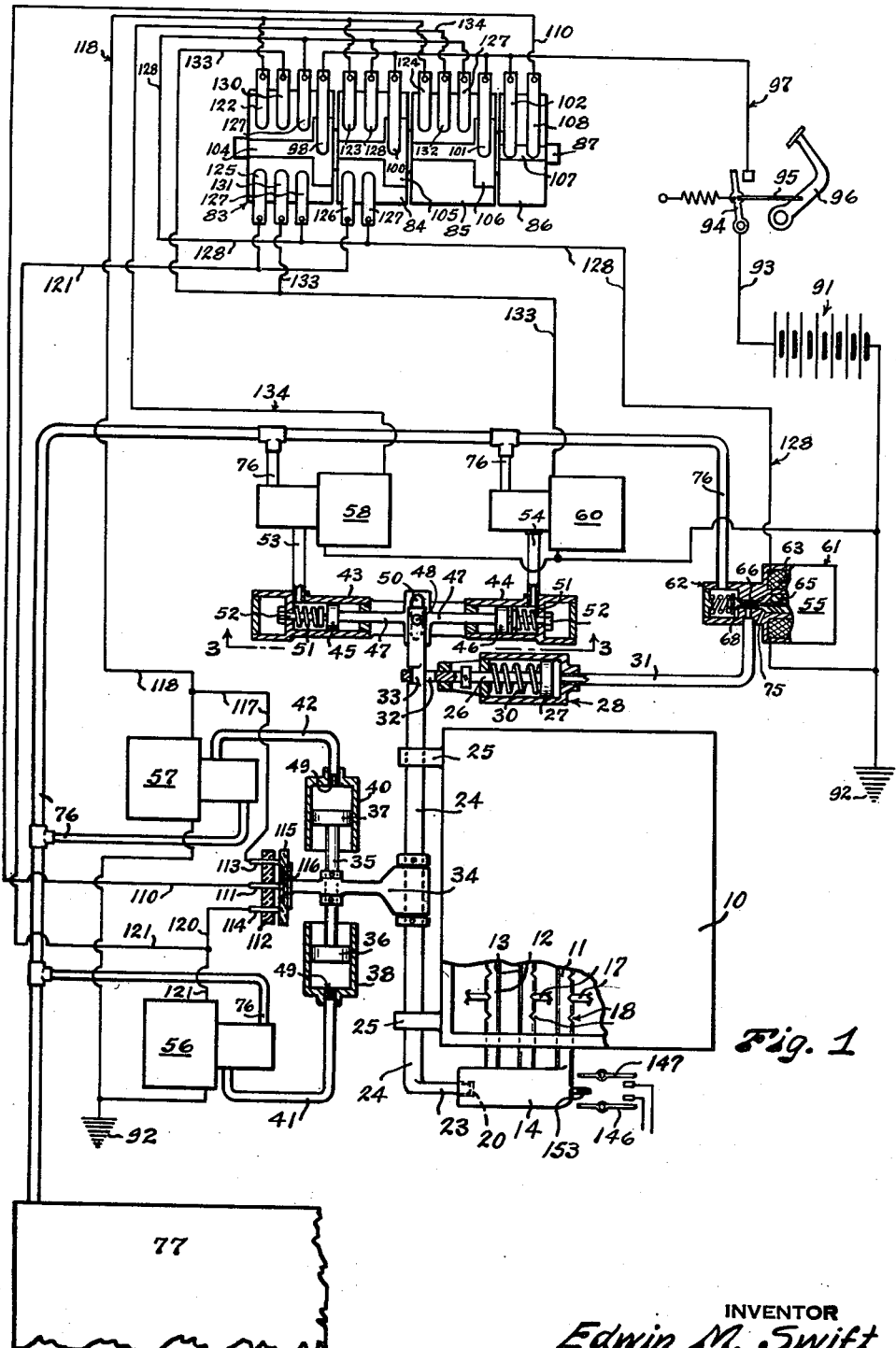

Referring to the drawings, 10 designates a gear housing which may contain a multiple speed gear transmission of the type commonly employed by motor vehicles. The general form of the transmission is well known and the several gear members which make up the transmission are not shown. The present gear shift is, however, adapted for use with a transmission which has four forward speeds, one reverse speed and a neutral position. The gears, not shown, within the gear box 10 have their driving relations controlled in the usual manner by three shifter rods 11, 12 and 13 which are respectively provided on their outer ends and external to the gear box, with transversely extending arm portions 14, 15 and 16 which are rigidly secured to the rods 11, 12 and 13 and preferably extend at right angles thereto. Yieldingly supported detent members 17 are arranged to engage within notches 18 in the shifter rods to yieldingly hold said shifter rods in desired positions.

The arm portions 14, 15 and 16 on the ends of the shifter rods are respectively provided with notches 20, 21 and 22 within which a finger 23 on the end of an angularly and reciprocably movable actuating bar 24 may engage. The actuating bar 24 is supported for angular and longitudinal movement in bearings 25 on the side of the gear box 10 and the finger 23 preferably extends at substantially right angles to the bar 24 whereby oscillatory or angular movement of the bar 24 to a predetermined position may selectively position the finger 23 within the notch 20, 21 or 22 of the arm portion of any desired shifter rod and thus select the shifter rod which is to be moved. The arm portions 14, 15 and 16 are wide enough so that they will always maintain engagement of the finger 23 with any arm portion which has been engaged and moved until said arm portion has been returned to neutral position.

The actuating bar 24 is adapted to be locked in one position by locking dog means comprising a plunger 26 secured to a piston 27 within a pneumatic cylinder 28. The piston 27 is urged into locked position by a compression spring 30 and is adapted to be moved into unlocked position against the compression of the spring 30 by the pressure of air which is admitted through a pipe 31. A slot 32 in the end of the plunger 26 fits over the actuating bar 24 and is engagable within a notch 33 in said bar 24. When the force of the spring 30 holds the plunger 26 in the position shown in Fig. 1, the smaller end portion of the slot 32 of said plunger will be engaged within the notch 33 and endwise movement of the actuating bar 24 will be prevented. When air under pressure is admitted to the cylinder 28 the spring 30 will be compresed, the plunger 26 will be moved toward the actuating bar 24 and the bar 24 will lie within the larger portion of the slot 32 and will be released so that it may be moved endwise.

The actuating bar 24 is adapted to be moved longitudinally by a yoke 34 which is fixedly connected with a piston rod 35. The piston rod 35 is secured to two pistons 36 and 37, disposed in two cylinders 38 and 40 respectively. Air conduit pipes 41 and 42 are connected with the ends of the cylinders 38 and 40 respectively whereby air under pressure may be supplied to said cylinders to move the piston rod 35 and yoke 34 in either direction.

The mechanism for oscillating the actuating bar 24 may comprise two aligned pneumatic cylinders 43 and 44 having pistons 45 and 46 movably disposed therein. The pistons 45 and 46 are connected with each other by a piston rod 47.

A rigid pin or lever arm 48 which extends at right angles from the actuating bar 24 is engaged with the piston rod 47, as by causing the end of said lever arm 48 to extend through a slot 50 in the piston rod, the slot 50 allowing free longitudinal movement of the actuating bar. When the piston rod 47 is moved longitudinally the actuating bar 24 will be oscillated thus selectively engaging the finger 23 with any predetermined shifter rod. Two compression springs 51 are disposed within the respective cylinders 43 and 44 and each exert a pressure against a movable member 52. The movable members 52 are separate from, but engage with, the pistons 45 and 46 so that when pneumatic pressure in the cylinders 43 and 44 is relieved the springs 51 will always tend to return the lever arm 48 and actuating bar 24 to the neutral or mid position. When the gears are shifted into driving relation, however, the force of the springs can not move the actuating bar angularly back to mid position because the notches 20, 21 and 22 will not all be in alignment and the finger 23 will be held in engagement with the arm 14 or 16 with which it is engaged until bar 24 is moved back to the neutral position and notches 20, 21 and 22 are brought into line. Pipes 53 and 54 are connected with cylinders 43 and 44 and serve as means through which air under pressure may be admitted to said cylinders.

In connection with the three different devices hereinbefore described for locking and releasing the actuating bar 24; and for moving said actuating bar 24 longitudinally; and for angularly moving said actuating bar into a selected position as respects the shifter rod arms 14, 15 and 16 it is necessary to provide means for controlling the admission of air under pressure to the several cylinders 28; 38 and 40; 43 and 44. I accomplish this by providing an electromagnetically controlled valve in the connection with the air line leading to each cylinder. These electromagnetic valves are shown in plan in Fig. 1, and are designated generally by numerals 55, 56, 57, 58 and 60 and may all be of duplicate construction. One of these electromagnetic valves, namely the valve 55, is shown in cross section in Fig. 4, and it will be understood that the inside mechanism of the other valves is substantially the same. Each electromagnetic valve may comprise a larger housing portion 61 and a smaller housing portion 62. An electromagnet coil 63 and an armature 64 are provided within housing portion 61. Armature 64 has a stem 65 which extends axially through the electromagnet coil 63 and is secured to a valve stem 66. The valve stem 66 extends lengthwise in a bore 67 of larger diameter than said valve stem in the housing part 62 and is secured to a valve 68 in a valve chamber 70. A compression spring 71 urges the valve 68 into a cloud position on a seat 72. The end of the armature stem 65 is coned as at 73 to form an exhaust control valve which is adapted to engage a valve seat 74 and close the exhaust passageway between the bore 67 and an exhaust port 75. An air intake pipe 76 which may lead to any suitable source of supply of air under pressure as to a compressed air reservoir 77, is connected with the valve chamber 70 and the pipe, as 31, which leads to the pneumatic cylinder is connected with the bore 67 between the valve seats 72 and 74. Air pressure in the valve chamber 70 will ordinarily act in conjunction with the spring 71 to hold the valve 68 closed and the exhaust valve 73 open. This allows free exhaust of air pressure in the pipe, as 31, which is connected with the pneumatic cylinder which the electromagnetic valve controls. If the electromagnet 63 is energized it will attract and move the armature 64 toward it. This movement will unseat the valve 68 and seat the valve 73 thus closing off the exhaust port 75 and connecting the air intake pipe 76 with the pipe, as 31, through which air under pressure may be conducted to the pneumatic device to be operated. This open or exhaust position of the valve 68 and closed position of the exhaust valve 73 will be maintained as long as the electromagnet remains energized.

The electromagnetic valve 55 is connected by the pipe 31 with the lock control cylinder 28 and controls the locking and unlocking of the actuating bar 24. The electromagnetic valves 56 and 57 are respectively connected by the pipes 41 and 42 with the cylinders 38 and 40 and control the longitudinal movement of the actuating bar 24. The electromagnetic valves 58 and 60 are respectively connected by the pipes 53 and 54 with the cylinders 43 and 44 and control the oscillating movement of the actuating bar whereby the selection of the shifter rod 11 or 13 with which the finger 23 will engage is made. Attention is called to the fact that the finger 23 will always be in engagement with arm 15 of shifter rod 12 when the several parts are in neutral position.

The means by which the driver controls the shifting of the gears is in the nature of a controller for making and breaking the circuits to the several electromagnets. This controller is disposed within a housing 79 which may be mounted in a position conveniently accessible from the driver's seat. It consists of a control lever 78 slidably supported on a rocker bar 80 which is mounted for oscillation in the housing 79 and which is preferably square in cross section. One end of the control lever 78 extends upwardly through an opening 81 in the top wall of the housing 77 and is adapted to be positioned in any selected one of a plurality of notches, marked 1, 2, 3, 4 and R, of said opening 81, said markings designating the position of said lever as, first, second, third, fourth or reverse gear. The other, or bottom, end of the lever 78 is adapted to engage within grooves 82 in any selected one of three different contact drums 83, 84 and 85. Another contact drum 86 is positioned alongside of the contact drums 83, 84 and 85 and all of said contact drums are mounted on a shaft 87 which is journaled in the housing 79. An operating arm 88 is secured to the rocker bar 80 and extends into a notch 90 in the contactor drum 86. The control lever 78 is movable along the slot 81 to position it in engagement with any selected one of the drums 83, 84 or 85 and is adapted to oscillate the drum with which it is engaged if said control lever is moved to any operative position. Each time the control lever 78 is oscillated or moved into position 1, 2, 3, 4 or R of opening 81 the rocker bar 80 will be oscillated therewith and the arm 88 will also be oscillated thus moving the drum 86 angularly each time one of the other drums is moved. As the lever 78 will only engage one of the other drums when it is opposite any notch in the edge of the slot 81 it will not be possible to move more than one of the drums 83, 84, or 85 at a time and the neutral control drum 86 will always be moved along with any one of the other drums.

Electric current for the purpose of energizing the electromagnets may be supplied from a battery 91, one terminal of which is grounded in well known manner, as indicated at 92. The other terminal of the battery 91 is connected by a wire 93 with a switch 94 which is connected as by means 95 with the clutch pedal 96 of the vehicle on which the apparatus is installed whereby when the clutch pedal is in a clutch-engaged position allowing a driving engagement of the clutch, the switch 94 will be open and when the clutch pedal is depressed to release or disengage the clutch the switch 94 will be closed. From the switch 94 a circuit wire 97 extends to, and is connected in parallel with, four contact members 98, 100, 101 and 102 which are positioned in engagement with the respective contact drums 83, 84, 85 and 86. This affords a connection from the battery 91 to each contact drum. The contact drums 83, 84, 85 and 86 are preferably made of insulating material and said drums have electrically conductive switch members 104, 105, 106 and 107 embedded therein and substantially flush with the periphery thereof. The switch members 104, 105 and 106 are preferably of T shape, as shown, with the head of the T extending circumferentially of the drum and the contact members 98, 100 and 101 rest on the head portions of the respective T shaped switch members whereby they will always maintain electrical contact with said switch members in all angular positions of the drums. The switch member 107 on the drum 86 is preferably a straight bar and the contact member 102 contacts said bar only when the drum 86 is in the medial or neutral position and is out of contact with said switch bar when the drum 86 is turned to either side of the neutral position by movement of the control lever 78 into any of the driving positions 1, 2, 3, 4 or R. This breaks the neutral circuit when the control lever 78 is in any position except a neutral position. Another contact member 108 is provided alongside of the contact member 102 and in contact with the neutral drum 86. The contact member 108 is connected by circuit wire 110 with a medially positioned brush like contact member 111 of an auxiliary switch which is operated by movement of the piston rod 35 which moves in unison with the longitudinal movement of the actuating bar 24. This auxiliary switch may comprise a fixed plate 112 of insulating material, having the contact member 111 and two other brush like contact members 113 and 114 therein, and a movable plate 115 also of insulating material secured to and carried by the piston rod 35 and having a blade or strip 116 of electrically conductive material thereon which blade 116 is positioned for engagement by the brush like contact members 111, 113 and 114. The contact members 113 and 114 are spaced far enough apart and are suitably positioned so that when the blade member 116 is in the medial or neutral position, shown in Fig. 1, it will be between said contact members 113 and 114 and out of contact with both of the same. It follows that, in the neutral position of the gears, the circuit through this auxiliary switch, which is controlled by movement of piston rod 35, will be broken and when the gears are in any meshed position a circuit through this switch will be closed. The contact member 113 is connected by a circuit wire 117 with another circuit wire 118 which leads to the electromagnet in the valve 57. The contact member 114 is connected by a circuit wire 120 with another circuit wire 121 which leads to, and is connected with, the electromagnet of the valve member 56. The switch 111—112—113—114 thus maintains an open neutral circuit irrespective of the electrical connection between the contact members 102 and 108 at all times when the gears are in neutral position and makes possible the closing of this neutral circuit whenever the gears are in a driving position, it being understood that the piston rod 35 is always at one extreme when the gears are in driving relation. The circuit wire 118 is electrically connected with three fixed contact members 122, 123 and 124 which are positioned in engagement with the respective contact drums 83, 84 and 85 and which control respectively the shift into first, second, and reverse gears as designated by 1, 2 and R on the gear housing cover. In a like manner the circuit wire 121 is electrically connected with two fixed contact members 125 and 126 which engage respectively the contact members 104 and 105 of drums 83 and 84 and which control respectively the shifting of the gear shift rods into second and fourth gears as designated by 3 and 4 on the control housing cover. Five other fixed contact members 127 are positioned, two in engagement with the drum 83, two in engagement with the drum 84 and one in engagement with the drum 85. These five contact members 127 are all connected by common circuit wire means 128 with the electromagnet in the valve member 55 which controls the locking and releasing of the actuating bar 24, whereby when the control lever 78 is moved into any of the gear shifting positions a circuit to the electromagnet which controls the releasing of the lock for the actuating bar 24 will always be closed.

Three other fixed contact members 130, 131 and 132 are provided for controlling the circuits to the electromagnets of the valve units by which the selecting of the gears to be shifted is accomplished. The fixed contact members 130 and 131 are positioned in engagement with the contact drum 83 and are connected by a common circuit wire 133 with the electromagnet in the valve unit 60. The fixed contact member 132 is positioned in engagement with the contact drum 85 and is electrically connected by a circuit wire 134 with the electromagnet of the valve unit 58. The springs 51 in the cylinders 43 and 44 always return the actuating bar 24 to the medial position, angularly considered, and the shifts for gears 3 and 4 are made from this medial position by movement of shifter rod 12 and are controlled by angular movement of the contact drum 84. Consequently it is not necessary to have any selector control contact members in connection with the contact drum 84.

The fixed contact members used in connection with the drums 83, 84, 85 and 86 are preferably secured to supports 135 of insulating material within the controller housing 79 and extend outwardly and make brush like contact with the lower peripheral portions of the drums, as more clearly shown in Fig. 6.

When the gears are in any driving relation the control lever 78 may be moved to select a different driving relation into which the driver contemplates shifting said gears but the gears will not be shifted until the closing of the circuits is completed by disengaging the clutch and closing the switch 94. It is thus possible for the control lever 78 to be in a position in the slot 81 different from the actual driving position of the gears and, for this reason, it becomes desirable to provide visual means for indicating the actual driving relation of the gears at all times. This may be accomplished by providing in the control housing cover in close relation to the gear markings 1, 2, 3, 4 and R, five lamps 136, 137, 138, 139 and 140 designating respectively reverse, fourth, third, second, and first gear engagement. For the neutral position no lamp need be provided, as the absence of any lighted lamp on the controlled housing cover may designate that the gears are in neutral position. The lamps 136, 137, 138, 139 and 140 shown diagrammatically in Fig. 9 are respectively connected by circuit wires 141, 142, 143, 144 and 145 with normally open switches 146, 147, 148, 149 and 150. These switches are supplied with current by a common circuit wire 151, and are normally held open by spring means 152, and are arranged to be closed by engagement therewith of means 153 on the several gear shift rods when said gear shift rods are moved to any engaged gear position. As it is only possible to establish one engaged gear or driving relation at a time it will only be possible to close one of the switches 146—150 at a time and the switch which is closed will always light the correct lamp to indicate the driving relation of the gears.

The circuits to the several lamps and electromagnets may be completed by grounding in the usual manner, as indicated in several instances at 92.

The operation of this gear shift mechanism is as follows, it being assumed that operation is started from the neutral position shown in Fig. 1. To shift into first gear the control lever 78 is moved longitudinally along the shaft 87 until it is opposite notch 1 and the bottom end of said lever is in drum 83. Said lever is then moved angularly into notch 1, thus angularly moving drum 83 and closing the circuit through lock releasing contact 127 of drum 83, selector contact 130, and shift contact 122. If the vehicle clutch is disengaged at the time the control lever 78 is moved to a shifting position then the shift will be made at once, but if the clutch is in engaged position then the shift will not be made until the clutch pedal 96 is depressed and the switch 94 closed. A preferred mode of operation is to position the control lever 78 in accordance with a predetermined gear shift which is to be made and then bring about the shifting of the gears by depressing the clutch pedal 96 and closing the switch 94. With the control lever 78 set at 1 and the switch 94 closed circuits will be completed to the lock releasing valve 55, the selector valve 60 and the shifter control valve 57. This supplies air under pressure to the cylinders 28, 40 and 44 with the result that the plunger 26 is first moved to unlock the actuating bar 24, the piston rod 47 is then moved to angularly position the actuating bar 24 so that the finger 23 thereon will engage with the correct lever arm 16 on the end of the proper shifter rod and the piston rod 35 will then be moved to make the proper shift. The proper time delay between the operation of the releasing valve and selector valves; and the actuating bar valves is obtained by restricting the area of the air inlet ports into the cylinders 38 and 40. These port restricting means are indicated at 49. As it is desired to have the lock releasing means and the selector means operate first, the air inlet port to the cylinders 28, 43 and 44 are not restricted. The actuating rod moving means, which can not operate until after operation of the selector means and release of the lock, has port restricting means for cylinders 38 and 40 which delays the operation of the pistons in these cylinders until after the pistons in the selector cylinders 43 and 44 and lock control cylinder 28 have operated.

After a shift, as the shift from neutral to first gear has been completed the clutch pedal 96 will ordinarily be released to permit re-engagement of the clutch. This will open the switch 94 and break the circuit to all of the electromagnets whereupon the springs 71 will close the air inlet valves 68 and open the exhaust valves 73 permitting exhaust of the air from the several cylinders but leaving the actuating bar 24 and shifter rod in the positions to which they have been shifted. It should be noted that this apparatus does not depend on the pneumatic or electric devices to hold the gears in an operative position after a shift has been made. Whenever the actuating bar 24 is shifted in either direction from the neutral position, shown in Fig. 1, the contact 111 of the switch which is controlled by said actuating bar, will be electrically connected either with the contact member 113 or 114. If the control lever 78 is then moved to a neutral position and the clutch control switch 94 closed a circuit through drums 83 and 86 will be completed to the electromagnet of valve 56 or 57 and the gears will be moved to a neutral position. In the shift from first speed to neutral the circuit to electromagnet of valve 56 will be closed. When the control lever 78 is in neutral position all circuits to the electromagnet of the lock releasing valve 55 will be open and the locking plunger 26 will be free to engage with and lock into the notch 33 of the actuating bar 24 as said bar reaches the neutral position thus preventing the shift mechanism from being carried beyond the neutral position.

The shift from neutral into any other gear may be made in substantially the same way as the shift from neutral to first gear except that different sets of contact members are brought into use. The shifts into third and fourth gears are controlled by the contact drum 84 and are made by movement of the medial gear shift rod 12. As the springs 51 always tend to move the actuating bar 24 to the medial angular position when said bar 24 is in neutral and thus position the finger 23 in the notch 21 of the arm 15 it is not necessary to provide selector means for the third and fourth gears. A shift from one gear to another, as from first to second, may be made directly without stopping in the neutral position. For instance if the gears are in first speed and the lever 24 is moved into notch "2" and the clutch switch 94 closed by depressing the clutch pedal circuits will be completed through lock releasing contact 127 of drum 83 to the electromagnet of valve 55, and through contact 131 to the electromagnet of selector valve 60 and through contact 125 to the electromagnet of shifter control valve 56. With these circuits closed the lock member will be held in released position and the second gear angular position of bar 24 will be selected and the shift will be quickly made from first to second gear by one continuous movement.

I claim:

1. Gear shift means for use in connection with a multiple speed gear transmission which is provided with a plurality of longitudinally movable gear shift rods; embodying a longitudinally movable actuating bar having means engageable with said gear shift rods whereby the gear shift rods may be moved; selector means connected with said actuating bar and adapted to angularly position the same for selective engagement with different gear shift rods; locking means operatively connected with said actuating bar; pneumatic lock retracting devices connected with said locking means; pneumatic operating devices connected with said selector means; other pneumatic operating devices connected with said actuating bar; and remote control means connected with all of said pneumatic operating devices.

2. Gear shift means for use in connection with a multiple speed gear transmission which is provided with a plurality of longitudinally movable gear shift rods; embodying a longitudinally movable actuating bar having means engageable with said gear shift rods; selector means connected with said actuating bar and adapted to angularly position the same for selective engagement with different gear shift rods; locking means operatively connected with said actuating bar; pneumatic lock retracting devices connected with said locking means; pneumatic operating devices connected with said selector means; other pneumatic operating devices connected with said actuating bar; electromagnetic control means connected with each of said pneumatic operating devices; and remote control switch mechanism connected with said electromagnetic control means.

3. Gear shift means for use in connection with a multiple speed gear transmission which is provided with a plurality of longitudinally movable gear shift rods; embodying a longitudinally movable actuating bar having means engageable with said gear shift rods; selector means connected with said actuating bar and adapted to angularly position the same for selective engagement with different gear shift rods; locking means operatively connected with said actuating bar; pneumatic lock retracting devices connected with the locking means; pneumatic operating devices connected with said selector means; other pneumatic operating devices connected with said actuating bar; electromagnetic control means connected with each of said pneumatic operating devices; a source of supply of electric current; circuits connecting said source of supply of electric current with each of said electromagnetic control means; a remote control selective switch connected with said circuits; and a clutch controlled switch connected with the clutch operating means of the vehicle and common to all of said circuits.

4. Gear shift means for use in connection with a multiple speed gear transmission; embodying an actuating bar connected with the gears to be shifted; electromagnets controlling the movement of said actuating bar; a control switch; a source of supply of electric current; a plurality of operating circuits connecting said control switch with said electromagnets; a neutralizing circuit connecting said control switch with said electromagnets, said neutralizing circuit being closed through said control switch when said control switch is in neutral position; an auxiliary switch in said neutralizing circuit; and means connecting said auxiliary switch with said actuating bar moving means whereby said last named switch will be open when said actuating bar moving means is in gear neutralizing position and closed when said actuating bar moving means is in any gear-engaged position.

5. In gear shift means of the class described; a plurality of electromagnetically controlled gear shifting devices; and a controller switch for said gear shifting devices, said controller switch embodying a plurality of angularly movable gear-shifting contact members and an angularly movable gear neutralizing contact member, a shifting lever selectively engageable with different gear-shifting contact members whereby said gear-shifting contact members may be moved one at a time, and means connecting said gear neutralizing contact member with said lever, whereby said gear neutralizing contact member will always be moved by angular movement of said lever.

6. In gear shift means of the class described; a plurality of electromagnetically controlled gear shifting devices; circuits connected with the electromagnets of said gear shifting devices; and a controller switch for said circuits; said controller switch embodying a plurality of angularly movable gear-shifting contact drums and an angularly movable gear neutralizing contact drum, a shifting lever selectively movable lengthwise of said drums into operative engagement with any selected one of said gear-shifting contact drums, and means connecting said gear neutralizing contact drum with said lever whereby said gear neutralizing contact drum will always be moved by angular movement of said lever.

7. Gear shift means for use in connection with a multiple speed gear transmission which is provided with a plurality of longitudinally movable gear shift rods; embodying a longitudinally movable actuating bar adapted to engage said gear shift rods; pneumatic cylinder means; piston means movable in said pneumatic cylinder means; means connecting said actuating bar with said piston means for simultaneous movement of said actuating bar and said piston in the same direction; two conduits for compressed air connected with said cylinder means on opposite sides of said piston means; two valve devices controlling the supply and exhaust of compressed air relative to said conduits respectively; an electromagnet controlling opening and closing movement of each of said valve devices; circuit means connected with each electromagnet; remote control switch means provided in the circuit to each electromagnet; a neutralizing circuit, and an auxiliary switch in said neutralizing circuit connected with the actuating bar and arranged to be open when said actuating bar is in a neutral position and closed when said actuating bar is in gear engaged position.

8. Gear shift means for use in connection with a multiple speed gear transmission which is provided with a plurality of longitudinally movable gear shift rods; embodying a longitudinally movable actuating bar adjustable by angular movement into operative engagement with any one of said gear shift rods; pneumatic cylinder means; piston means movable in said pneumatic cylinder means; means operatively connecting said actuating bar with said piston means; two conduits for compressed air connected with said cylinder means on opposite sides of said piston means; two valve devices controlling the supply and exhaust of compressed air relative to said conduits respectively; an electromagnet controlling opening and closing movement of each of said valve devices; circuit means connected with each electromagnet; switch means in the circuit to each electromagnet; electromagnetically controlled selector means connected with said actuating bar, whereby said actuating bar may be moved angularly into selective engagement with different gear shift rods; switch means for said electromagnetically controlled selector means, locking means releasably engaging said actuating bar; retracting devices connected with said locking means; electromagnetic control means connected with said retracting devices; and switch means connected with said last named electromagnetic control means.

9. Gear shift means for use in connection with a multiple speed gear transmission which is provided with a plurality of longitudinally movable gear shift rods; embodying a longitudinally movable actuating bar; finger means on the end of said actuating bar adjustable by angular movement of said actuating bar into operative engagement with any one of said gear shift rods; pneumatic cylinder means; piston means movable in said pneumatic cylinder means; means connecting said actuating bar with said piston means for simultaneous movement in the same direction; two conduits for compressed air connected with said cylinder means on opposite sides of said piston means; two valve devices controlling the supply and exhaust of compressed air relative to said conduits respectively; an electromagnet controlling opening and closing movement of each of said valve devices; circuit means connected with each electromagnet; remote control switch means for the circuit to each electromagnet; other pneumatic cylinder means having piston means therein; lever arm means secured to said actuating bar and arranged to be angularly moved by said last named piston means; pneumatic conduits connected with said last named cylinder means on both sides of said piston means; valves controlling the supply and exhaust of compressed air to said last named conduits; electromagnets controlling movement of said last named valves; remote control switch means for said last named valves; locking means releasably engaging said actuating bar; pneumatically operated retracting devices connected with said locking means; electromagnetic control means connected with said retracting devices; remote control switch means for said last named electromagnetic control means; and remotely controlled neutralizing means connected with the operating means for said actuating bar.

EDWIN M. SWIFT.